(12) United States Patent
Zheng et al.

(10) Patent No.: US 11,222,125 B1
(45) Date of Patent: Jan. 11, 2022

(54) BIOMETRIC RECOGNITION ATTACK TEST METHODS, APPARATUSES, AND DEVICES

(71) Applicant: ALIPAY (HANGZHOU) INFORMATION TECHNOLOGY CO., LTD., Zhejiang (CN)

(72) Inventors: Jianxu Zheng, Hangzhou (CN); Wenting Chang, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/362,965

(22) Filed: Jun. 29, 2021

(30) Foreign Application Priority Data

Jul. 13, 2020 (CN) .......................... 202010670696.4

(51) Int. Cl.
| | | |
|---|---|---|
| G06F 21/00 | (2013.01) | |
| G06F 21/57 | (2013.01) | |
| G06F 21/32 | (2013.01) | |
| G06F 21/71 | (2013.01) | |

(52) U.S. Cl.
CPC ............ *G06F 21/577* (2013.01); *G06F 21/32* (2013.01); *G06F 21/71* (2013.01)

(58) Field of Classification Search
CPC ......... G06F 21/577; G06F 21/32; G06F 21/71
See application file for complete search history.

(56) References Cited

U.S. PATENT DOCUMENTS

2008/0226136 A1  9/2008  Takaku et al.
2015/0199561 A1*  7/2015  Jeong .................. G06K 9/00288
                                                                  382/118
2018/0357500 A1* 12/2018  Lin ..................... G06K 9/00899
(Continued)

FOREIGN PATENT DOCUMENTS

| CN | 106250857 | 12/2016 |
|---|---|---|
| CN | 106767995 | 5/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jeffrey C Pwu
*Assistant Examiner* — William A Corum, Jr.
(74) *Attorney, Agent, or Firm* — Fish & Richardson P.C.

(57) ABSTRACT

Methods, systems, and apparatus for operations for performing a biometric recognition attack test on a biometric recognition device. An example method includes obtaining a test object for performing the biometric recognition attack test corresponding to the target user; performing the biometric recognition attack test on the biometric recognition device, comprising: controlling a mechanical arm to place the test object in a recognition area of the biometric recognition device; controlling the mechanical arm to adjust the test object to have a plurality of different test object poses with respect to the biometric recognition device; obtaining a test result for the test object in each test object pose of the plurality of different test object poses; and determining an attack test result of the biometric recognition attack test on the biometric recognition device corresponding to the target user.

18 Claims, 5 Drawing Sheets

(56) References Cited

U.S. PATENT DOCUMENTS

| | | | |
|---|---|---|---|
| 2019/0266388 A1* | 8/2019 | Kolagunda | G06K 9/00208 |
| 2019/0347388 A1* | 11/2019 | Jiang | G06K 9/6273 |
| 2021/0150238 A1* | 5/2021 | Arora | G06K 9/6263 |
| 2021/0232808 A1* | 7/2021 | Nguyen | H04N 9/3185 |

FOREIGN PATENT DOCUMENTS

| | | |
|---|---|---|
| CN | 107918327 | 4/2018 |
| CN | 111044939 | 4/2020 |
| WO | WO 2017113762 | 7/2017 |
| WO | WO 2019075660 | 4/2019 |

OTHER PUBLICATIONS

Nakamoto, "Bitcoin: A Peer-to-Peer Electronic Cash System," www.bitcoin.org, 2005, 9 pages.

European Extended Search Report in European Application No. 21181669.9, dated Nov. 26, 2021, 5 pages.

\* cited by examiner

| Biometric recognition attack test | |
|---|---|
| Information about a target user to be tested | |
| Biometric recognition | Facial recognition ▽ |
| Test duration | |
| Test start time | |
| Quantity of test objects | |
| Test result | |

Confirm   Cancel

FIG. 2

BIOMETRIC RECOGNITION ATTACK TEST METHODS, APPARATUSES, AND DEVICES

CROSS-REFERENCE TO RELATED APPLICATIONS

This application claims priority to Chinese Patent Application No. 202010670696.4, filed on Jul. 13, 2020, which is hereby incorporated by reference in its entirety.

TECHNICAL FIELD

The present specification relates to the field of computer technologies, and in particular, to biometric recognition attack test methods, apparatuses, and devices.

BACKGROUND

Biometric recognition (for example, facial recognition, iris recognition, and retina recognition) is usually implemented by using corresponding biometric recognition algorithms. There are many machine learning algorithms applied to the biometric recognition algorithms, and the machine learning algorithms yield more stochastic results.

A biometric recognition capability of a biometric recognition device usually can be manually tested. That is, a plurality of different test volunteers are called up, and then a biometric recognition test is performed on each of the test volunteers until all of the test volunteers complete the test, to obtain a test result. However, there are many machine learning algorithms applied to the biometric recognition algorithms, and the machine learning algorithms yield more stochastic results, and therefore a large quantity of attempts need to be made in the process of testing the biometric recognition capability of the biometric recognition device. Consequently, many human resources need to be consumed, there is a long test period, there are large error variances between manual operations in a manual test, and it is difficult to implement reproduction. Therefore, a better biometric recognition test solution needs to be provided, to more efficiently and accurately test biometric recognition.

SUMMARY

Embodiments of the present specification are intended to provide a better biometric recognition test solution, to more efficiently and accurately test biometric recognition.

To implement the previous technical solution, the embodiments of the present specification are implemented as follows:

Embodiments of the present specification provide a biometric recognition attack test method. The method includes the following: A test object needed for performing a biometric recognition attack on a target user is obtained based on information about the target user to be tested, where the test object includes a test image and/or a physical model of a body part corresponding to the biometric recognition attack; a mechanical arm is controlled to place the test image or the physical model of the body part in the test object in a recognition area of a biometric recognition device, and the mechanical arm is controlled to adjust the test object in a plurality of different positions and poses to perform a biometric recognition attack test, to obtain a test result for the test object in each position and pose; and a test result of the biometric recognition attack performed on the target user is determined based on the test result corresponding to the test object in each position and pose.

Embodiments of the present specification provide a biometric recognition attack test apparatus. The apparatus includes: a test object acquisition module, configured to obtain, based on information about a target user to be tested, a test object needed for performing a biometric recognition attack on the target user, where the test object includes a test image and/or a physical model of a body part corresponding to the biometric recognition attack; an attack test module, configured to control a mechanical arm to place the test image or the physical model of the body part in the test object in a recognition area of a biometric recognition device, and control the mechanical arm to adjust the test object in a plurality of different positions and poses to perform a biometric recognition attack test, to obtain a test result for the test object in each position and pose; and a test result determining module, configured to determine, based on the test result corresponding to the test object in each position and pose, a test result of the biometric recognition attack performed on the target user.

Embodiments of the present specification provide a biometric recognition attack test device. The biometric recognition attack test device includes: a processor; and a memory configured to store a computer-executable instruction. When the executable instruction is executed, the processor is enabled to perform the following operations: obtaining, based on information about a target user to be tested, a test object needed for performing a biometric recognition attack on the target user, where the test object includes a test image and/or a physical model of a body part corresponding to the biometric recognition attack; controlling a mechanical arm to place the test image or the physical model of the body part in the test object in a recognition area of a biometric recognition device, and controlling the mechanical arm to adjust the test object in a plurality of different positions and poses to perform a biometric recognition attack test, to obtain a test result for the test object in each position and pose; and determining, based on the test result corresponding to the test object in each position and pose, a test result of the biometric recognition attack performed on the target user.

Embodiments of the present specification further provide a storage medium. The storage medium is configured to store a computer-executable instruction. When the executable instruction is executed, the following procedures are implemented: obtaining, based on information about a target user to be tested, a test object needed for performing a biometric recognition attack on the target user, where the test object includes a test image and/or a physical model of a body part corresponding to the biometric recognition attack; controlling a mechanical arm to place the test image or the physical model of the body part in the test object in a recognition area of a biometric recognition device, and controlling the mechanical arm to adjust the test object in a plurality of different positions and poses to perform a biometric recognition attack test, to obtain a test result for the test object in each position and pose; and determining, based on the test result corresponding to the test object in each position and pose, a test result of the biometric recognition attack performed on the target user.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description are merely some of the embodiments described in the present specification. A person of ordinary skill in the art can further derive other drawings from these accompanying drawings without creative efforts.

FIG. 2 is a schematic structural diagram of a biometric recognition attack test interface, according to the present specification;

DETAILED DESCRIPTION OF EMBODIMENTS

The embodiments of the present specification provide biometric recognition attack test methods, apparatuses, and devices.

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

Embodiment 1

Figure 1:
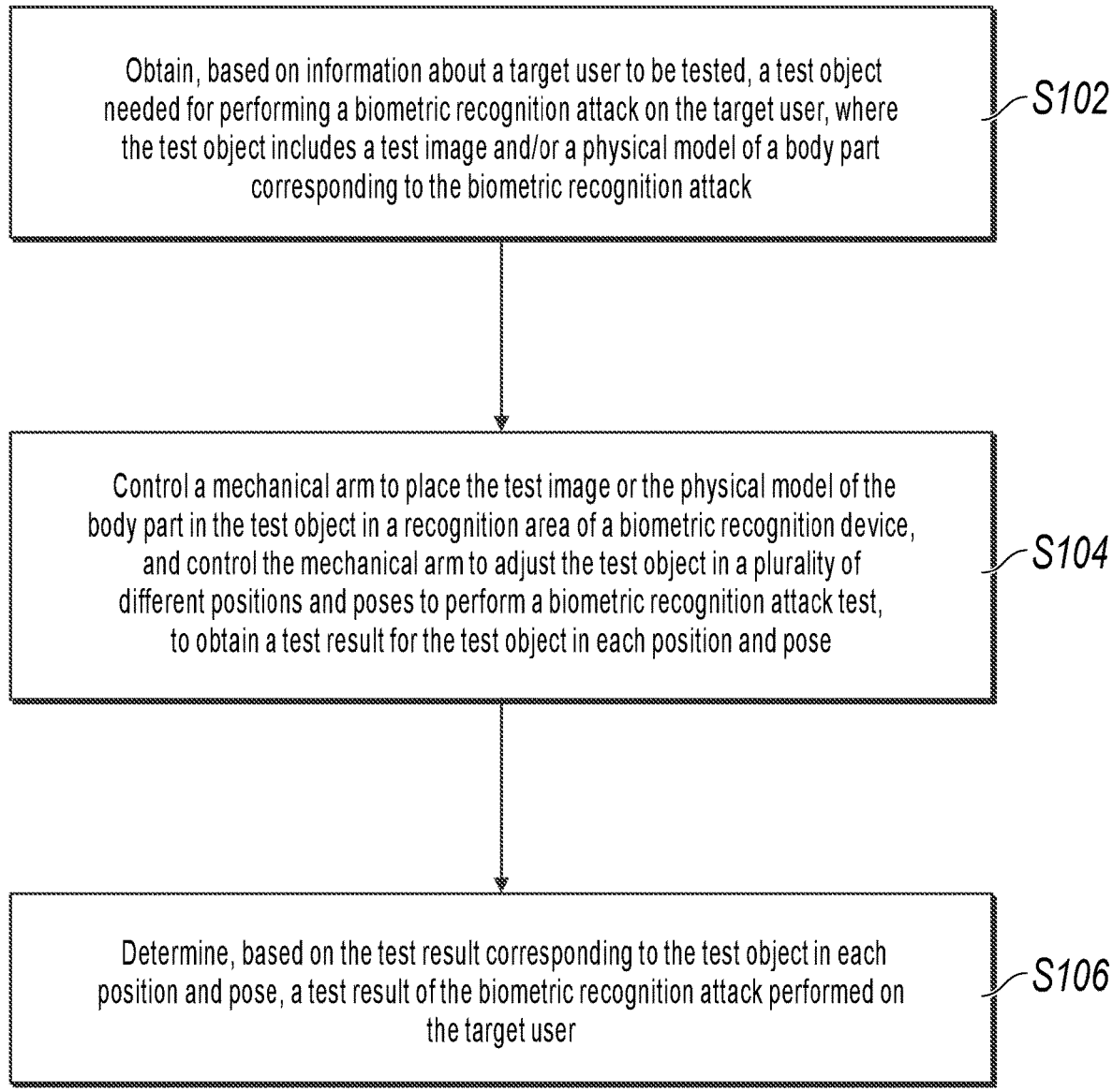
FIG. 1 is an embodiment illustrating a biometric recognition attack test method, according to the present specification.

As shown in FIG. 1, the embodiments of the present specification provide a biometric recognition attack test method. The method can be performed by a biometric recognition test device. The test device can include a main control child device, a mechanical arm, etc. The main control child device can be a terminal device or a server. The server can be an independent server or a server cluster that includes a plurality of servers. The server can be a back-end server of a financial service, an online shopping service, etc., or can be a back-end server of a certain application program, etc. The terminal device can be a mobile terminal device such as a mobile phone or a tablet computer, or can be a device such as a personal computer. In the embodiments of the present specification, an example in which the main control child device is a terminal device is used for detailed description. For the case of the server, references can be made to the following related content. Details are omitted here for simplicity. The mechanical arm can be connected to the main control child device. The main control child device can send a control instruction to the mechanical arm. The mechanical arm can perform a corresponding operation based on the control instruction. A camera component (for example, a camera) can be disposed on the mechanical arm. The accuracy of the operation of the mechanical arm can be calibrated and fed back by using the camera component, and an object on which an operation is to be performed can be found and determined by using the camera component. The method can specifically include the following steps.

Step S102: Obtain, based on information about a target user to be tested, a test object needed for performing a biometric recognition attack on the target user, where the test object includes a test image and/or a physical model of a body part corresponding to the biometric recognition attack.

The target user can be any user, for example, a tester, or a volunteer for which the test is performed. The information about the target user can be information related to the target user. For example, the information about the target user can include a name, an identity card number, a mobile phone number, a facial image, an iris image, or a retina image of the target user. The information about the target user can be specifically set based on an actual situation. The biometric recognition attack can be a process of recognizing a biometric feature of a user through an image, etc., and perform an attack on the process, to verify a recognition capability of a biometric recognition device. For example, an attack is performed on facial recognition of the user, to verify a facial recognition capability of the biometric recognition device. For another example, an attack is performed on iris recognition of the user, to verify an iris recognition capability of the biometric recognition device. The biometric recognition attack can be specifically set based on an actual situation. Implementations are not limited the embodiments of the present specification. The test object can be a sample or a case to be used for performing the above attack test. There can be one or more test objects. Each test object can include one or more test images. The test image can be an image related to image-based biometric recognition. For example, if biometric recognition is facial recognition, the test image can be a facial image, if biometric recognition is iris recognition, the test image can be an iris image, or if biometric recognition is retina recognition, the test image can be a retina image. The test image can be specifically set based on an actual situation. Implementations are not limited the embodiments of the present specification. The physical model of the body part corresponding to the biometric recognition attack can be a multi-dimensional physical model of the body part corresponding to the biometric recognition attack. For example, the physical model of the body part corresponding to the biometric recognition attack is a three-dimensional physical model of a face corresponding to a facial recognition attack, which is specifically, for example, a three-dimensional mask. For another example, the physical model of the body part corresponding to the biometric recognition attack is a three-dimensional physical model of an eye corresponding to an iris recognition attack, which is specifically, for example, a three-dimensional eye model.

In implementation, biometric recognition (for example, facial recognition, iris recognition, and retina recognition) is usually implemented by using corresponding biometric recognition algorithms. There are many machine learning algorithms applied to the biometric recognition algorithms, and the machine learning algorithms yield more stochastic results. The biometric recognition capability of the biometric recognition device usually can be manually tested. That is, a plurality of different test volunteers are called up, and then a biometric recognition test is performed on each of the test volunteers until all of the test volunteers complete the test, to obtain a test result. However, there are many machine learning algorithms applied to the biometric recognition algorithms, and the machine learning algorithms yield more stochastic results, and therefore a large quantity of attempts need to be made in the process of testing the biometric recognition capability of the biometric recognition device. Consequently, many human resources need to be consumed, there is a long test period, there are large error variances between manual operations in a manual test, and it is difficult to implement reproduction. Therefore, a better biometric recognition test solution needs to be provided, to more efficiently and accurately test biometric recognition. Embodiments of the present specification provide an implementable technical solution, which can specifically include the following content:

To perform an attack test on biometric recognition better, test images can be respectively set for different test volunteers. For example, for facial recognition, a plurality of images of each test volunteer in different poses can be separately obtained, and an image including a facial image can be used as a test image. For another example, for iris recognition, iris images of each test volunteer at a plurality of different poses can be separately obtained, and the iris image can be used as a test image. After test images of different test volunteers are obtained by using the above method, test objects needed for performing an image-based biometric recognition attack can be generated based on the obtained test images. Each test object can include one or more test images of a certain test volunteer, or can include one or more test images of a plurality of different test volunteers.

To improve test efficiency, a test interface can be developed in advance by using a corresponding programming language based on processing mechanisms of biometric recognition and a biometric recognition attack test. As shown in FIG. 2, the test interface can include an input box of information about a target user to be tested, a biometric recognition selection box, test duration, a test start time, a quantity of test objects, a test result output box, a confirm button, a cancel button, etc. When a biometric recognition attack needs to be performed on a certain biometric recognition device, a tester can determine a user (namely, a target user) to which the biometric recognition device belongs, and then can obtain related information of the target user, for example, a facial image or an iris image of the target user. The obtained related information can be input into the input box of the information about the target user. After the input is completed, the tester can further select, by using the biometric recognition selection box based on an actual situation, a biometric recognition process to be performed, and can set the test duration, the test start time, the quantity of test objects, etc. After the setting is completed, the tester can start a test process, that is, the tester can click the confirm button on the interface. In this case, the test device can obtain the related information of the target user to be tested from the input box of the information about the target user, and can further obtain a biometric recognition test type, the test duration, the test start time, the quantity of test objects, etc. The related information of the target user and the other information obtained above can be analyzed to determine a test object needed for performing an image-based biometric recognition attack on the target user.

For example, facial recognition is selected in the biometric recognition selection box, the test start time is a current moment, the test duration and the quantity of test objects do not have to be limited, and the information about the target user to be tested can be an identifier such as a name of the target user. In this case, related information such as a reference facial image for setting facial recognition of the target user can be obtained based on the identifier of the target user, and then a test object whose similarity with the reference facial image for setting the facial recognition of the target user is greater than a predetermined threshold can be selected from a test object database based on the related information such as the reference facial image for setting the face recognition of the target user, and the selected test object can be used as the test object needed for performing the image-based biometric recognition attack on the target user.

Step S104: Control the mechanical arm to place the test image or the physical model of the body part in the test object in a recognition area of the biometric recognition device, and control the mechanical arm to adjust the test object in a plurality of different positions and poses to perform a biometric recognition attack test, to obtain a test result for the test object in each position and pose.

The recognition area can be an area in which the user can be effectively recognized in a process of performing biometric recognition by the biometric recognition device. Facial recognition is used as an example. In this case, a spatial area whose horizontal distance from the biometric recognition device is 10 cm to 100 cm and that is directly in front of the biometric recognition device can be used as the recognition area. Specifically, the recognition area can be set based on an actual situation. Implementations are not limited the embodiments of the present specification. The position and pose can refer to a position, a placement pose, etc. The position can be geographical location coordinates, coordinates corresponding to a coordinate system that is established by using a certain point or surface as a starting point or a starting surface and set based on an actual situation, etc. The placement pose can be an inclined pose, a horizontal pose, an inverted pose, etc. The position and pose can be specifically set based on an actual situation. Implementations are not limited the embodiments of the present specification.

In implementation, after determining the test object needed for performing the biometric recognition attack on the target user, the main control child device in the test device can analyze the obtained test object, to determine a quantity of test images and/or a quantity of physical models of the body part and current position information of the test user, and then can send the position information of the test object to the mechanical arm. The mechanical arm can identify a position of the test object by using the camera component based on the position information of the test object, and then the mechanical arm can move to the identified position to pick up the test object. If the test object includes a plurality of test images and/or a plurality of physical models of a body part, the mechanical arm can pick up each test image or each physical model of a body part based on a position of the corresponding test image or the corresponding physical model of the body part. After the mechanical arm picks up the corresponding test image or the physical model of the body part, the tester can place or affix the biometric recognition device in a designated position, or the main control child device can send an instruction of setting the biometric recognition device to the mechanical arm. The mechanical arm can identify the biometric recognition device by using the camera component, and then can pick up the biometric recognition device, and place or affix the biometric recognition device in the designated position.

The main control child device can determine the recognition area of the biometric recognition device, and can control the mechanical arm to place the test image or the physical model of the body part in the test object in the recognition area of the biometric recognition device after determining the recognition area of the biometric recognition device. In this case, the test device can trigger the biometric recognition device to perform biometric recognition processing. Alternatively, the biometric recognition device can automatically enable biometric recognition processing, and the biometric recognition device can start a camera component of the biometric recognition device to collect the test image or the physical model of the body part in the recognition area, and can record a recognition result. The main control child device can further control the mechanical arm to adjust a position and pose of the test object, so that the test object can be in a plurality of different positions and poses. The plurality of different positions and poses can be determined based on a plurality of different dimensions, for example, a two-dimensional position and pose, a three-dimensional position and pose, or a five-dimensional position and pose. The position and pose can be specifically set based on an actual situation. Implementations are not limited the embodiments of the present specification. For each position and pose, the biometric recognition device can start the camera component of the biometric recognition device to collect the test image or the physical model of the body part in the recognition area, and can record the recognition result at the same time. Based on the above method, the biometric recognition attack test can be performed to obtain the test result for the test object in each position and pose, and the test device can obtain the test result.

Step S106: Determine, based on the test result corresponding to the test object in each position and pose, a test result of the biometric recognition attack performed on the target user.

The test result of the biometric recognition attack performed on the target user can include an attack success rate, biometric recognition accuracy, etc. The test result can be specifically set based on an actual situation. Implementations are not limited the embodiments of the present specification.

In implementation, the test result corresponding to the test object in each position and pose can be statistically analyzed, to determine a quantity of test results indicating a pass and a quantity of test results indicating a fail, and then the test result of the biometric recognition attack performed on the target user can be determined based on a statistical analysis result. For example, the test object includes one test image, the test device controls the mechanical arm to adjust the test image in 27 positions and poses, two positions and poses correspond to test results indicating a pass, and the other 25 positions and poses correspond to test results indicating a fail. In this case, the test result of the biometric recognition attack on the target user can include the attack success rate of 2/27=7.4%, the biometric recognition accuracy of 92.6%, etc.

The embodiments of the present specification provide the biometric recognition attack test method. The test object needed for performing the biometric recognition attack on the target user is obtained based on the information about the target user to be tested, where the test object includes the test image and/or the physical model of the body part corresponding to the biometric recognition attack; and the mechanical arm is controlled to place the test image or the physical model of the body part in the test object in the recognition area of the biometric recognition device. In this case, the biometric recognition attack test is performed by using the mechanical arm, and therefore human resources are saved. In addition, various parameters (for example, a distance) of the mechanical arm are within a controllable range, thereby reducing an objective error in a manual test. In addition, the mechanical arm can be further controlled to adjust the test object in the plurality of different positions and poses to perform the biometric recognition attack test, to obtain the test result for the test object in each position and pose; and the test result of the biometric recognition attack performed on the target user is determined based on the test result corresponding to the test object in each position and pose. In this case, the test is controlled by using the mechanical arm, and therefore test efficiency and test accuracy are improved.

Embodiment 2

Figure 3:
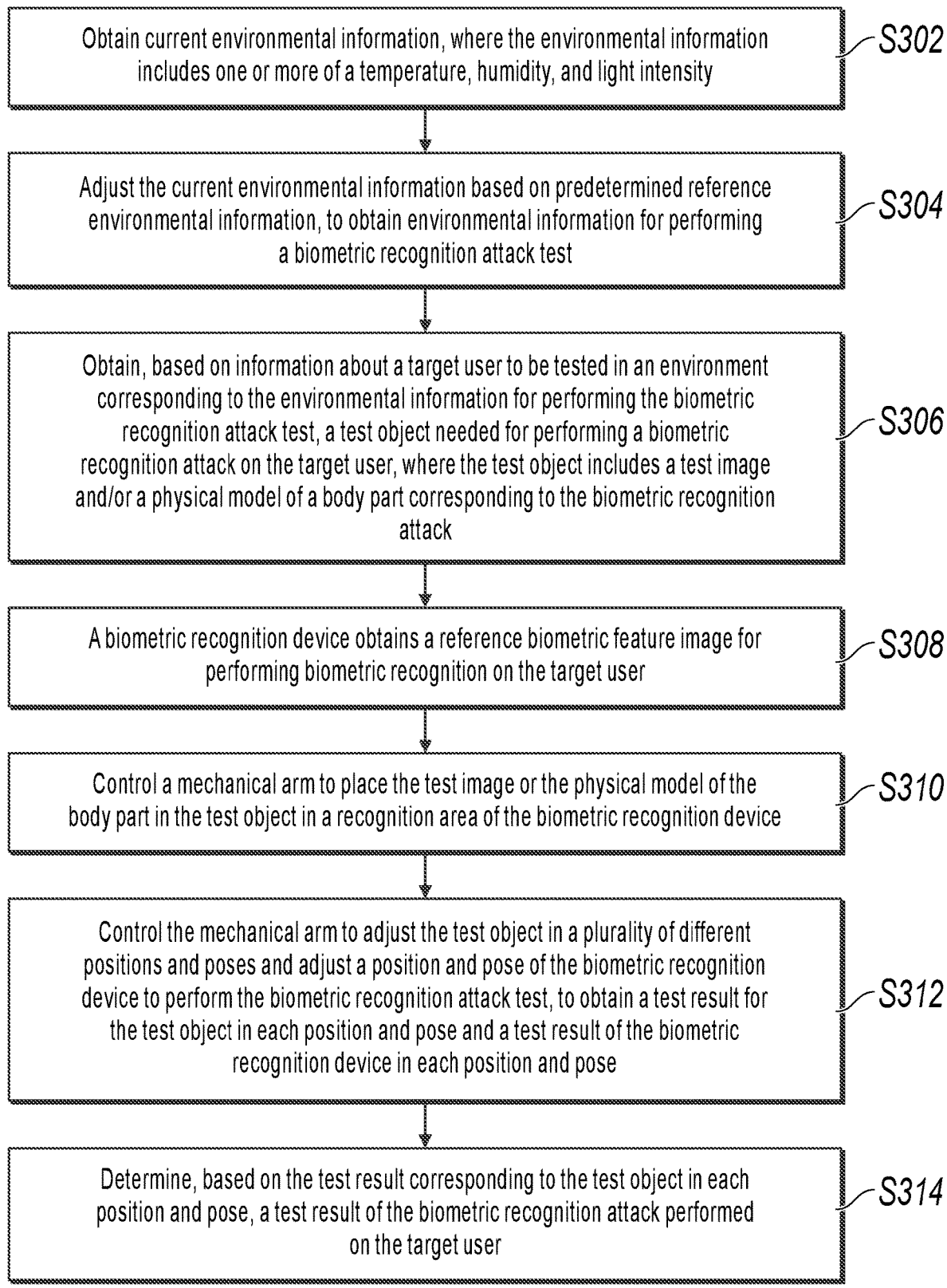
FIG. 3 is an embodiment illustrating another biometric recognition attack test method, according to the present specification.

As shown in FIG. 3, the embodiments of the present specification provide a biometric recognition attack test method. The method can be performed by a biometric recognition test device. The test device can include a main control child device, a mechanical arm, etc. The main control child device can be a terminal device or a server. The server can be an independent server or a server cluster that includes a plurality of servers. The server can be a back-end server of a financial service, an online shopping service, etc., or can be a back-end server of a certain application program, etc. The terminal device can be a mobile terminal device such as a mobile phone or a tablet computer, or can be a device such as a personal computer. The embodiments of the present specification, an example in which the main control child device is a terminal device is used for detailed description. For the case of the server, references can be made to the following related content. Details are omitted here for simplicity. The mechanical arm can be connected to the main control child device. The main control child device can send a control instruction to the mechanical arm. The mechanical arm can perform a corresponding operation based on the control instruction. A camera component (for example, a camera) can be disposed on the mechanical arm. The accuracy of the operation of the mechanical arm can be calibrated and fed back by using the camera component, and an object on which an operation is to be performed can be determined by using the camera component. The method can specifically include the following steps.

Step S302: Obtain current environmental information, where the environmental information includes one or more of a temperature, humidity, and light intensity.

In addition to the above information, the environmental information can include other related information. The environmental information can be specifically set based on an actual situation.

In implementation, a temperature sensor, a humidity sensor, a light intensity sensor, etc. can be further disposed in the test device. The current temperature, the humidity, and the light intensity can be respectively obtained by the sensors. In other words, the current temperature can be detected by the temperature sensor, the current humidity can be detected by the humidity sensor, and the current light intensity can be detected by the light intensity sensor. The temperature, the humidity, the light intensity, etc. detected by the sensors can be provided for the test device, so that the test device can obtain the current environmental information.

Step S304: Adjust the current environmental information based on predetermined reference environmental information, to obtain environmental information for performing a biometric recognition attack test.

The reference environmental information can be predetermined standard environmental information, and the reference environmental information can vary with the biometric recognition attack test. For example, a facial recognition attack test and an iris recognition attack test can correspond to different reference environmental information.

In implementation, a different environment exerts certain impact on biometric recognition, for example, a different temperature exerts impact on sensitivity of a facial recognition component. Specifically, if an environmental temperature is lower than a predetermined temperature threshold, the sensitivity of the facial recognition component is obviously reduced. To eliminate a case in which different biometric recognition attack test results are obtained due to changes in the environment, uniform environmental information (namely, reference environmental information) can be predetermined. The reference environmental information can be environmental information corresponding to an environment in which least impact is exerted on a biometric recognition component or the biometric recognition component has the best stability, etc. The reference environmental information can be specifically set based on an actual situation.

After the reference environmental information is set by using the above method, when the current environmental information is obtained, the current environmental information can be adjusted by using the reference environmental information, so that the current environmental information matches the reference environmental information. For example, the reference environmental information can include a temperature of 25° C., and the current environmental information can include a temperature of 10° C. In this case, the current temperature can be adjusted, so that a value of the temperature reaches 25. Alternatively, the current temperature can be adjusted to a temperature range that matches 25° C., for example, 24° C. to 26° C. Finally, the environmental information for performing the biometric recognition attack test can be obtained.

Based on the obtained environmental information, step S102 in Embodiment 1 can be implemented by using the following step S306. For details, references can be made to the following step S306.

Step S306: Obtain, based on information about a target user to be tested in an environment corresponding to the environmental information for performing the biometric recognition attack test, a test object needed for performing a biometric recognition attack on the target user, where the test object includes a test image and/or a physical model of a body part corresponding to the biometric recognition attack.

In implementation, the test object needed for performing the biometric recognition attack on the target user is obtained based on the information about the target user to be tested in the environment corresponding to the environmental information for performing the biometric recognition attack test. For a specific processing process of step S306 of obtaining, based on the information about the target user to be tested, the test object needed for performing the biometric recognition attack on the target user, references can be made to FIG. 2 and the specific processing process of step S102 in Embodiment 1.

Alternatively, step S306 can be implemented by using the following method: obtaining, based on information about a target user to be tested, an identifier of a test object needed for performing a biometric recognition attack on the target user, where the identifier is set based on a graphic code; and controlling the mechanical arm to obtain the test object corresponding to the identifier from a test object database based on the identifier by scanning the graphic code by using the camera component disposed on the mechanical arm.

In implementation, one or more identifiers can be set for each test object, a corresponding graphic code (for example, a barcode or a two-dimensional code) can be generated by using the identifier, and the generated graphic code can be correspondingly stored with the test object. A certain test object can be identified by scanning a graphic code corresponding to the test object by using the camera component disposed on the mechanical arm. The above implementation is merely an optional implementation, and there can be a plurality of different implementations in practice. Implementations can be specifically set based on an actual situation.

It is worthwhile to note that if the test object includes the test image, the test image can be obtained by using the following method: obtaining first data for the target user that is pre-stored in the biometric recognition device, where the first data includes one or more of an image, a video, and a binary file; and determining, based on the first data, a test image needed for performing the biometric recognition attack on the target user.

The binary file can be a binary image, a binary video, etc.

In practice, in addition to the above method, the test image can be obtained by using a plurality of methods. An implementable method for obtaining the test image is further provided below, and can specifically include the following content: obtaining second data of the target user that is pre-collected by the biometric recognition device through a camera component, where the second data includes one or more of an image, a video, and a binary file; and determining, based on the second data, a test image needed for performing the biometric recognition attack on the target user.

Step S308: The biometric recognition device obtains a reference biometric feature image for performing biometric recognition on the target user.

The reference biometric feature image can be a standard biometric feature image, and an accurate or real biometric feature is recorded in the reference biometric feature image. The biometric recognition device can include but is not limited to a personal computer, a mobile phone, a trading tool (for example, a vending machine), and various wearable devices (for example, a smart band or a smart watch).

In implementation, to perform an attack test on the biometric recognition device, the reference biometric feature image can be entered into the biometric recognition device in advance. Specifically, a reference biometric feature image entry interface can be provided in the biometric recognition device. When the target user needs to enter the reference biometric feature image into the biometric recognition device, the entry interface can be launched by using the biometric recognition device, the camera component of the biometric recognition device can be triggered by the entry interface, and one or more biometric feature images of the target user can be collected based on the camera component. The biometric recognition device can generate, based on the one or more collected biometric feature images, the reference biometric feature image for performing biometric recognition on the target user, and can store the reference biometric feature image in the biometric recognition device.

It is worthwhile to note that in addition to the above method, the reference biometric feature image can be obtained by using various methods. Two implementable methods are further provided below. For details, references can be made to method 1 and method 2.

Method 1: Third data for the target user that is pre-stored in the biometric recognition device is obtained, where the third data includes one or more of an image, a video, and a binary file; and the reference biometric feature image for performing biometric recognition on the target user is determined based on the third data.

Method 2: Fourth data of the target user that is pre-collected by the biometric recognition device through the camera component is obtained, where the fourth data includes one or more of an image, a video, and a binary file; and the reference biometric feature image for performing biometric recognition on the target user is determined based on the fourth data.

Step S310: Control the mechanical arm to place the test image or the physical model of the body part in the test object in a recognition area of the biometric recognition device.

Step S312: Control the mechanical arm to adjust the test object in a plurality of different positions and poses and adjust a position and pose of the biometric recognition device to perform the biometric recognition attack test, to obtain a test result for the test object in each position and pose and a test result of the biometric recognition device in each position and pose.

In implementation, the mechanical arm can be controlled to adjust the test object in the plurality of different positions and poses. For a specific processing process, references can be made to the related content in step S104 in Embodiment 1. Details are omitted here for simplicity. In addition, the position and pose of the biometric recognition device are adjusted when the test object is adjusted in the plurality of different positions and poses, so that a combination of the plurality of different positions and poses of the test object and the position and pose of the biometric recognition device can be obtained. For example, the positions and poses of the test object can include A1, A2, and A3, and positions and poses of the biometric recognition device can include B1 and B2. In this case, combinations of positions and poses can include A1B1, A1B2, A2B1, A3B1, A2B2, A3B2, etc. The biometric recognition attack test can be performed based on different combinations of positions and poses, to obtain the test result (namely, a test result corresponding to each combination of positions and poses) for the test object in each position and pose and the test result of the biometric recognition device in each position and pose.

It is worthwhile to note that the mechanical arm can be controlled to adjust the test object in the plurality of different positions and poses by using a plurality of different methods. Two optional processing methods are provided below, and can specifically include processing in the following method 1 and method 2.

Method 1: The mechanical arm is controlled to adjust the test object in the plurality of different positions and poses along an axis in a three-dimensional coordinate system to perform the biometric recognition attack test, to obtain the test result for the test object in each position and pose.

In implementation, the position and pose of the test object can be adjusted by using the axis in the three-dimensional coordinate system. For example, the position and pose of the test object can be adjusted along an x axis, a y axis, or a z axis. A specific adjustment process can be set based on an actual situation. Implementations are not limited the embodiments of the present specification.

Method 2: The mechanical arm is controlled to adjust the test object in the plurality of different positions and poses along one or more of a predetermined spherical radius, a predetermined horizontal pose, and a predetermined vertical pose in a polar coordinate system to perform the biometric recognition attack test, to obtain the test result for the test object in each position and pose.

In implementation, in addition to adjusting the position and pose of the test object by using the axis in the three-dimensional coordinate system, the test device can adjust the position and pose of the test object by using a corresponding processing method in the polar coordinate system. For example, the test device can adjust the position and pose of the test object along the predetermined spherical radius or the predetermined horizontal pose. A specific adjustment process can be set based on an actual situation. Implementations are not limited the embodiments of the present specification.

Based on the above content, the mechanical arm can be controlled to adjust the position and pose of the biometric recognition device by using a plurality of different methods. Two optional processing methods are provided below, and can specifically include processing in the following method 1 and method 2.

Method 1: The mechanical arm is controlled to adjust the position and pose of the biometric recognition device along the axis in the three-dimensional coordinate system.

Method 2: The mechanical arm is controlled to adjust the position and pose of the biometric recognition device along one or more of the predetermined spherical radius, the predetermined horizontal pose, and the predetermined vertical pose in the polar coordinate system.

The biometric recognition device can perform biometric recognition on the test object based on the reference biometric feature image, to obtain a corresponding recognition result, and can provide the obtained recognition result for the test device. The test device can determine the test result for the test object in each position and pose and the test result of the biometric recognition device in each position and pose based on the recognition result.

Based on the above processing, relative positions of the biometric recognition device and the test object can be automatically and dynamically adjusted. A test range can cover an entire trajectory range of the test object by performing a plurality of attack tests. The relative positions of the biometric recognition device and the test object can be adjusted, so that a ratio of the test range to the trajectory range of the test object can be dynamically adjusted. For details, references can be made to the following related content. An area covered by the test object in the plurality of different positions and poses is greater than or equal to an area corresponding to the biometric recognition attack test.

Figure 4:
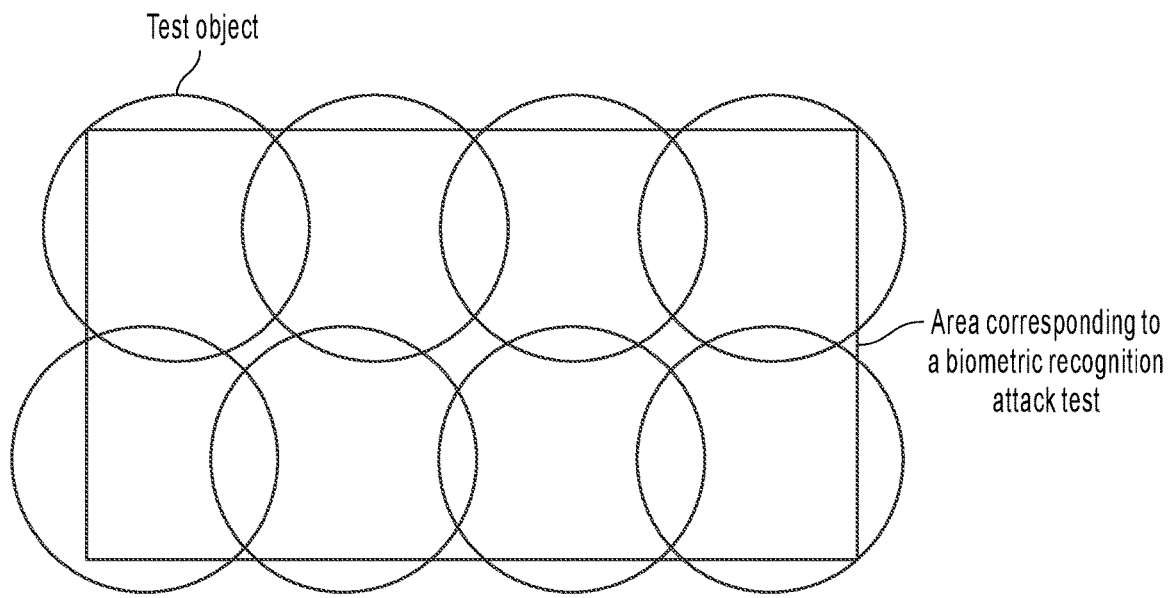
FIG. 4 is a schematic diagram illustrating a relationship between an area covered by a test object in a plurality of different positions and poses and an area corresponding to a biometric recognition attack test, according to the present specification.

As shown in FIG. 4, a plurality of circular areas are the trajectory range of the test object, and the test range is a range of a rectangular area. Clearly, the area covered by the test object in the plurality of different positions and poses is greater than or equal to the area corresponding to the biometric recognition attack test. As such, test accuracy and comprehensiveness can be improved.

Step S314: Determine, based on the test result corresponding to the test object in each position and pose, a test result of the biometric recognition attack performed on the target user.

In implementation, the test result corresponding to the test object in each position and pose can be obtained by using the camera component disposed on the mechanical arm. Alternatively, the test result corresponding to the test object in each position and pose can be obtained from information recorded in the biometric recognition device in advance. Finally, the test result of the biometric recognition attack performed on the target user can be determined based on the obtained test result corresponding to the test object in each position and pose. For a specific processing procedure, references can be made to the related content in Embodiment 1. Details are omitted here for simplicity.

In addition, when the test object includes the test image, the test device can adjust the test image by using the following method. The method can specifically include: controlling the mechanical arm to adjust one or more of brightness, color saturation, and a play speed of the test image to perform the biometric recognition attack test, to obtain a test result for the test image.

In implementation, the test image can be displayed by a display device. The mechanical arm can adjust the brightness, the color saturation, the play speed, etc. of the test image by using an image adjustment button provided in the display device, and can obtain the biometric recognition attack test by using the adjusted test image, to obtain the test result for the test image. For a specific processing procedure, references can be made to the related content in Embodiment 1. Details are omitted here for simplicity.

Based on the above processing, processing of step S314 can be: determining, based on the test result corresponding to the test object in each position and pose and the test result for the test image, the test result of the biometric recognition attack performed on the target user.

The embodiments of the present specification provide the biometric recognition attack test method. The test object needed for performing the biometric recognition attack on the target user is obtained based on the information about the target user to be tested, where the test object includes the test image and/or the physical model of the body part corresponding to the biometric recognition attack; and the mechanical arm is controlled to place the test image or the physical model of the body part in the test object in the recognition area of the biometric recognition device. In this case, the biometric recognition attack test is performed by using the mechanical arm, and therefore human resources are saved. In addition, various parameters (for example, a distance) of the mechanical arm are within a controllable range, thereby reducing an objective error in a manual test. In addition, the mechanical arm can be further controlled to adjust the test object in the plurality of different positions and poses to perform the biometric recognition attack test, to obtain the test result for the test object in each position and pose; and the test result of the biometric recognition attack performed on the target user is determined based on the test result corresponding to the test object in each position and pose. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Embodiment 3

Figure 5:
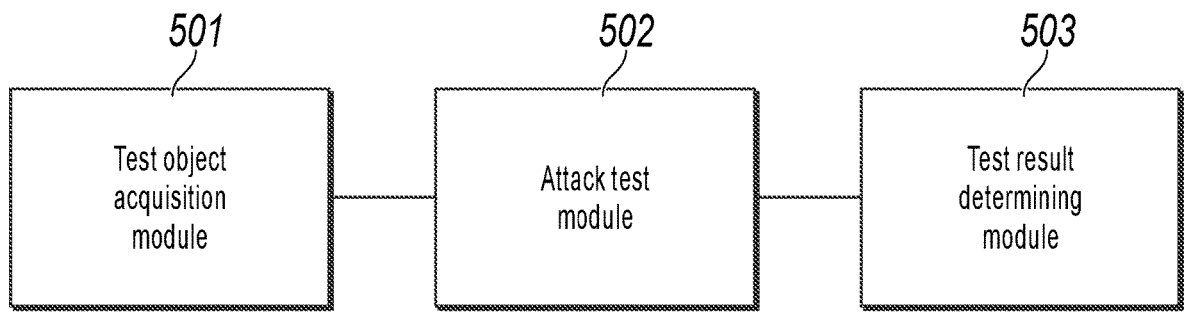
FIG. 5 is an embodiment illustrating a biometric recognition attack test apparatus, according to the present specification.

The biometric recognition attack test method provided in the embodiments of the present specification is described above. Based on the same idea, the embodiments of the present specification further provide a biometric recognition attack test apparatus, as shown in FIG. 5.

The biometric recognition attack test apparatus includes a test object acquisition module 501, an attack test module 502, and a test result determining module 503.

The test object acquisition module 501 is configured to obtain, based on information about a target user to be tested, a test object needed for performing a biometric recognition attack on the target user. The test object includes a test image and/or a physical model of a body part corresponding to the biometric recognition attack.

The attack test module 502 is configured to control a mechanical arm to place the test image or the physical model of the body part in the test object in a recognition area of a biometric recognition device, and control the mechanical arm to adjust the test object in a plurality of different positions and poses to perform a biometric recognition attack test, to obtain a test result for the test object in each position and pose.

The test result determining module 503 is configured to determine, based on the test result corresponding to the test object in each position and pose, a test result of the biometric recognition attack performed on the target user.

The embodiments of the present specification, the attack test module 502 is configured to control the mechanical arm to adjust the test object in the plurality of different positions and poses and adjust a position and pose of the biometric recognition device to perform the biometric recognition attack test, to obtain the test result for the test object in each position and pose and a test result of the biometric recognition device in each position and pose.

The embodiments of the present specification, the apparatus further includes:

an environmental information acquisition module, configured to obtain current environmental information, where the environmental information includes one or more of a temperature, humidity, and light intensity; and an environment adjustment module, configured to adjust the current environmental information based on predetermined reference environmental information, to obtain environmental information for performing the biometric recognition attack test; and the test object acquisition module 501 is configured to obtain, based on the information about the target user to be tested in an environment corresponding to the environmental information for performing the biometric recognition attack test, the test object needed for performing the biometric recognition attack on the target user.

The embodiments of the present specification, the test object includes the test image, and the apparatus further includes:

a first data acquisition module, configured to obtain first data for the target user that is pre-stored in the biometric recognition device, where the first data includes one or more of an image, a video, and a binary file; and a first test image determining module, configured to determine, based on the first data, a test image needed for performing the biometric recognition attack on the target user.

The embodiments of the present specification, the test object includes the test image, and the apparatus further includes:

a second data acquisition module, configured to obtain second data of the target user that is pre-collected by the biometric recognition device through a camera component, where the second data includes one or more of an image, a video, and a binary file; and a second test image determining module, configured to determine, based on the second data, a test image needed for performing the biometric recognition attack on the target user.

The embodiments of the present specification, the attack test module 502 is configured to control the mechanical arm to adjust the test object in the plurality of different positions and poses along an axis in a three-dimensional coordinate system to perform the biometric recognition attack test, to obtain the test result for the test object in each position and pose; or control the mechanical arm to adjust the test object in the plurality of different positions and poses along one or more of a predetermined spherical radius, a predetermined horizontal pose, and a predetermined vertical pose in a polar coordinate system to perform the biometric recognition attack test, to obtain the test result for the test object in each position and pose.

The embodiments of the present specification, an area covered by the test object in the plurality of different positions and poses is greater than or equal to an area corresponding to the biometric recognition attack test.

The embodiments of the present specification, the test object includes the test image, and the apparatus further includes:

an adjustment module, configured to control the mechanical arm to adjust one or more of brightness, color saturation, and a play speed of the test image to perform the biometric recognition attack test, to obtain a test result for the test image; and the test result determining module 503 is configured to determine, based on the test result corresponding to the test object in each position and pose and the test result for the test image, the test result of the biometric recognition attack performed on the target user.

The embodiments of the present specification, the test object acquisition module 501 includes:

an identifier acquisition unit, configured to obtain, based on the information about the target user to be tested, an identifier of the test object needed for performing the biometric recognition attack on the target user, where the identifier is set based on a graphic code; and a test object acquisition unit, configured to control the mechanical arm to obtain the test object corresponding to the identifier from a test object database based on the identifier by scanning the graphic code by using a camera component disposed on the mechanical arm.

The embodiments of the present specification provide the biometric recognition attack test apparatus. The test object needed for performing the biometric recognition attack on the target user is obtained based on the information about the target user to be tested, where the test object includes the test image and/or the physical model of the body part corresponding to the biometric recognition attack; and the mechanical arm is controlled to place the test image or the physical model of the body part in the test object in the recognition area of the biometric recognition device. In this case, the biometric recognition attack test is performed by using the mechanical arm, and therefore human resources are saved. In addition, various parameters (for example, a distance) of the mechanical arm are within a controllable range, thereby reducing an objective error in a manual test. In addition, the mechanical arm can be further controlled to adjust the test object in the plurality of different positions and poses to perform the biometric recognition attack test, to obtain the test result for the test object in each position and pose; and the test result of the biometric recognition attack performed on the target user is determined based on the test result corresponding to the test object in each position and pose. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Embodiment 4

Figure 6:
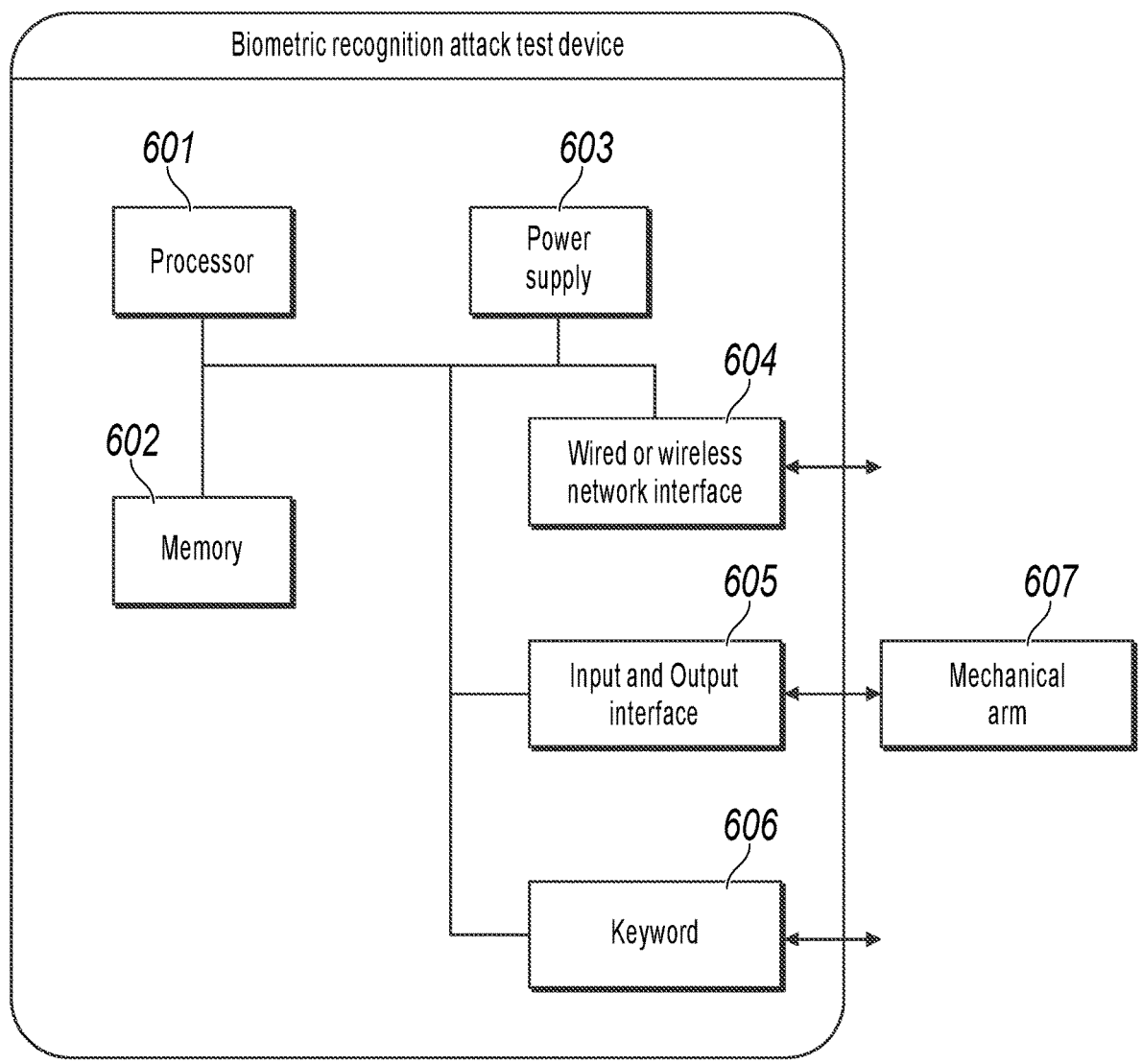
FIG. 6 is an embodiment illustrating a biometric recognition attack test device, according to the present specification.

The biometric recognition attack test apparatus provided in the embodiments of the present specification is described above. Based on the same idea, the embodiments of the present specification further provide a biometric recognition attack test device, as shown in FIG. 6.

The biometric recognition attack test device can be the biometric recognition test device provided in the above embodiments. The test device can include a main control child device, a mechanical arm, etc. The main control child device can be a terminal device or a server. The server can be an independent server or a server cluster that includes a plurality of servers. The server can be a back-end server of a financial service, an online shopping service, etc., or can be a back-end server of a certain application program, etc. The terminal device can be a mobile terminal device such as a mobile phone or a tablet computer, or can be a device such as a personal computer.

The biometric recognition attack test device can vary with configuration or performance, and can include one or more processors 601 and a memory 602. The memory 602 can store one or more memory application programs or data. The memory 602 can be transient or persistent storage. The application program stored in the memory 602 can include one or more modules (not shown in the figure). Each module can include a series of computer-executable instructions for the biometric recognition attack test device. Further, the processor 601 can be configured to communicate with the memory 602 to execute the series of computer-executable instructions in the memory 602 on the biometric recognition attack test device. The biometric recognition attack test device can further include one or more power supplies 603, one or more wired or wireless network interfaces 604, one or more input/output interfaces 605, one or more keyboards 606, and a mechanical arm 607.

Specifically, in the present embodiments, the biometric recognition attack test device includes a memory and one or more programs. The one or more programs are stored in the memory. The one or more programs can include one or more modules, and each module can include a series of computer-executable instructions for the biometric recognition attack test device. One or more processors are configured to execute the one or more programs including for use in the following computer-executable instructions:

obtaining, based on information about a target user to be tested, a test object needed for performing a biometric recognition attack on the target user, where the test object includes a test image and/or a physical model of a body part corresponding to the biometric recognition attack;

controlling a mechanical arm to place the test image or the physical model of the body part in the test object in a recognition area of a biometric recognition device, and controlling the mechanical arm to adjust the test object in a plurality of different positions and poses to perform a biometric recognition attack test, to obtain a test result for the test object in each position and pose; and determining, based on the test result corresponding to the test object in each position and pose, a test result of the biometric recognition attack performed on the target user.

The embodiments of the present specification, the controlling the mechanical arm to adjust the test object in a plurality of different positions and poses to perform a biometric recognition attack test, to obtain a test result for the test object in each position and pose includes:

controlling the mechanical arm to adjust the test object in the plurality of different positions and poses and adjust a position and pose of the biometric recognition device to perform the biometric recognition attack test, to obtain the test result for the test object in each position and pose and a test result of the biometric recognition device in each position and pose.

The embodiments of the present specification, the following operations are further included:

obtaining current environmental information, where the environmental information includes one or more of a temperature, humidity, and light intensity; and adjusting the current environmental information based on predetermined reference environmental information, to obtain environmental information for performing the biometric recognition attack test; and the obtaining, based on information about a target user to be tested, a test object needed for performing a biometric recognition attack on the target user includes:

obtaining, based on the information about the target user to be tested in an environment corresponding to the environmental information for performing the biometric recognition attack test, the test object needed for performing the biometric recognition attack on the target user.

The embodiments of the present specification, the test object includes the test image, and a method for obtaining the test image includes:

obtaining first data for the target user that is pre-stored in the biometric recognition device, where the first data includes one or more of an image, a video, and a binary file; and determining, based on the first data, a test image needed for performing the biometric recognition attack on the target user.

The embodiments of the present specification, the test object includes the test image, and a method for obtaining the test image includes:

obtaining second data of the target user that is pre-collected by the biometric recognition device through a camera component, where the second data includes one or more of an image, a video, and a binary file; and determining, based on the second data, a test image needed for performing the biometric recognition attack on the target user.

The embodiments of the present specification, the controlling the mechanical arm to adjust the test object in a plurality of different positions and poses to perform a biometric recognition attack test, to obtain a test result for the test object in each position and pose includes:

controlling the mechanical arm to adjust the test object in the plurality of different positions and poses along an axis in a three-dimensional coordinate system to perform the biometric recognition attack test, to obtain the test result for the test object in each position and pose; or controlling the mechanical arm to adjust the test object in the plurality of different positions and poses along one or more of a predetermined spherical radius, a predetermined horizontal pose, and a predetermined vertical pose in a polar coordinate system to perform the biometric recognition attack test, to obtain the test result for the test object in each position and pose.

The embodiments of the present specification, an area covered by the test object in the plurality of different positions and poses is greater than or equal to an area corresponding to the biometric recognition attack test.

The embodiments of the present specification, the test object includes the test image, and the following operations are further included:

controlling the mechanical arm to adjust one or more of brightness, color saturation, and a play speed of the test image to perform the biometric recognition attack test, to obtain a test result for the test image; and the determining, based on the test result corresponding to the test object in each position and pose, a test result of the biometric recognition attack performed on the target user includes:

determining, based on the test result corresponding to the test object in each position and pose and the test result for the test image, the test result of the biometric recognition attack performed on the target user.

The embodiments of the present specification, the obtaining, based on information about a target user to be tested, a test object needed for performing a biometric recognition attack on the target user includes:

obtaining, based on the information about the target user to be tested, an identifier of the test object needed for performing the biometric recognition attack on the target user, where the identifier is set based on a graphic code; and controlling the mechanical arm to obtain the test object corresponding to the identifier from a test object database based on the identifier by scanning the graphic code by using a camera component disposed on the mechanical arm.

The embodiments of the present specification provide the biometric recognition attack test device. The test object needed for performing the biometric recognition attack on the target user is obtained based on the information about the target user to be tested, where the test object includes the test image and/or the physical model of the body part corresponding to the biometric recognition attack; and the mechanical arm is controlled to place the test image or the physical model of the body part in the test object in the recognition area of the biometric recognition device. In this case, the biometric recognition attack test is performed by using the mechanical arm, and therefore human resources are saved. In addition, various parameters (for example, a distance) of the mechanical arm are within a controllable range, thereby reducing an objective error in a manual test. In addition, the mechanical arm can be further controlled to adjust the test object in the plurality of different positions and poses to perform the biometric recognition attack test, to obtain the test result for the test object in each position and pose; and the test result of the biometric recognition attack performed on the target user is determined based on the test result corresponding to the test object in each position and pose. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Embodiment 5

Further, based on the methods shown in FIG. 1 to FIG. 4, one or more embodiments of the present specification further provide a storage medium configured to store computer-executable instruction information. In a specific embodiment, the storage medium can be a USB flash drive, an optical disc, a hard disk, etc. When the computer-executable instruction information stored in the storage medium is executed by a processor, the following procedures can be implemented:

obtaining, based on information about a target user to be tested, a test object needed for performing a biometric recognition attack on the target user, where the test object includes a test image and/or a physical model of a body part corresponding to the biometric recognition attack;

controlling a mechanical arm to place the test image or the physical model of the body part in the test object in a recognition area of a biometric recognition device, and controlling the mechanical arm to adjust the test object in a plurality of different positions and poses to perform a biometric recognition attack test, to obtain a test result for the test object in each position and pose; and determining, based on the test result corresponding to the test object in each position and pose, a test result of the biometric recognition attack performed on the target user.

The embodiments of the present specification, the controlling the mechanical arm to adjust the test object in a plurality of different positions and poses to perform a biometric recognition attack test, to obtain a test result for the test object in each position and pose includes:

controlling the mechanical arm to adjust the test object in the plurality of different positions and poses and adjust a position and pose of the biometric recognition device to perform the biometric recognition attack test, to obtain the test result for the test object in each position and pose and a test result of the biometric recognition device in each position and pose.

The embodiments of the present specification, the following operations are further included:

obtaining current environmental information, where the environmental information includes one or more of a temperature, humidity, and light intensity; and adjusting the current environmental information based on predetermined reference environmental information, to obtain environmental information for performing the biometric recognition attack test; and the obtaining, based on information about a target user to be tested, a test object needed for performing a biometric recognition attack on the target user includes:

obtaining, based on the information about the target user to be tested in an environment corresponding to the environmental information for performing the biometric recognition attack test, the test object needed for performing the biometric recognition attack on the target user.

The embodiments of the present specification, the test object includes the test image, and a method for obtaining the test image includes:

obtaining first data for the target user that is pre-stored in the biometric recognition device, where the first data includes one or more of an image, a video, and a binary file; and determining, based on the first data, a test image needed for performing the biometric recognition attack on the target user.

The embodiments of the present specification, the test object includes the test image, and a method for obtaining the test image includes:

obtaining second data of the target user that is pre-collected by the biometric recognition device through a camera component, where the second data includes one or more of an image, a video, and a binary file; and determining, based on the second data, a test image needed for performing the biometric recognition attack on the target user.

The embodiments of the present specification, the controlling the mechanical arm to adjust the test object in a plurality of different positions and poses to perform a biometric recognition attack test, to obtain a test result for the test object in each position and pose includes:

controlling the mechanical arm to adjust the test object in the plurality of different positions and poses along an axis in a three-dimensional coordinate system to perform the biometric recognition attack test, to obtain the test result for the test object in each position and pose; or controlling the mechanical arm to adjust the test object in the plurality of different positions and poses along one or more of a predetermined spherical radius, a predetermined horizontal pose, and a predetermined vertical pose in a polar coordinate system to perform the biometric recognition attack test, to obtain the test result for the test object in each position and pose.

The embodiments of the present specification, an area covered by the test object in the plurality of different positions and poses is greater than or equal to an area corresponding to the biometric recognition attack test.

The embodiments of the present specification, the test object includes the test image, and the following operations are further included:

controlling the mechanical arm to adjust one or more of brightness, color saturation, and a play speed of the test image to perform the biometric recognition attack test, to obtain a test result for the test image; and the determining, based on the test result corresponding to the test object in each position and pose, a test result of the biometric recognition attack performed on the target user includes:

determining, based on the test result corresponding to the test object in each position and pose and the test result for the test image, the test result of the biometric recognition attack performed on the target user.

The embodiments of the present specification, the obtaining, based on information about a target user to be tested, a test object needed for performing a biometric recognition attack on the target user includes:

obtaining, based on the information about the target user to be tested, an identifier of the test object needed for performing the biometric recognition attack on the target user, where the identifier is set based on a graphic code; and controlling the mechanical arm to obtain the test object corresponding to the identifier from a test object database based on the identifier by scanning the graphic code by using a camera component disposed on the mechanical arm.

The embodiments of the present specification provide the storage medium. The test object needed for performing the biometric recognition attack on the target user is obtained based on the information about the target user to be tested, where the test object includes the test image and/or the physical model of the body part corresponding to the biometric recognition attack; and the mechanical arm is controlled to place the test image or the physical model of the body part in the test object in the recognition area of the biometric recognition device. In this case, the biometric recognition attack test is performed by using the mechanical arm, and therefore human resources are saved. In addition, various parameters (for example, a distance) of the mechanical arm are within a controllable range, thereby reducing an objective error in a manual test. In addition, the mechanical arm can be further controlled to adjust the test object in the plurality of different positions and poses to perform the biometric recognition attack test, to obtain the test result for the test object in each position and pose; and the test result of the biometric recognition attack performed on the target user is determined based on the test result corresponding to the test object in each position and pose. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Specific embodiments of the present specification are described above. Other embodiments fall within the scope of the appended claims. In some cases, the actions or steps described in the claims can be performed in a sequence different from that in the embodiments, and the desired results can still be achieved. In addition, the process described in the accompanying drawings does not necessarily require a particular sequence or sequential sequence shown to achieve the desired results. In some implementations, multi-tasking and parallel processing can be advantageous.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, current improvements of many method procedures can be considered as direct improvements of hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, a computer-readable medium that stores computer readable program code (such as software or firmware) that can be executed by a microprocessor or a processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of a logic gate, a switch, an application-specific integrated circuit, a programmable logic controller, and a built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously described embodiments can be specifically implemented by a computer chip or an entity, or can be implemented by a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when one or more embodiments of the present specification are implemented, function of units can be implemented in one or more pieces of software and/or hardware.

A person skilled in the art should understand that the embodiments of the present specification can be provided as methods, systems, or computer program products. Therefore, one or more embodiments of the present specification can use a form of hardware only embodiments, software only embodiments, or embodiments with a combination of software and hardware. In addition, one or more embodiments of the present specification can use a form of a computer program product that is implemented on one or more computer-usable storage media (including but not limited to a disk memory, a CD-ROM, an optical memory, etc.) that include computer-usable program code.

The embodiments of the present specification are described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable biometric recognition attack test device to generate a machine, so that the instructions executed by the computer or the processor of the another programmable biometric recognition attack test device generate an apparatus for implementing a specific function in one or more processes in the flowcharts and/or in one or more blocks in the block diagrams.

These computer program instructions can be stored in a computer readable memory that can instruct a computer or another programmable biometric recognition attack test device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable biometric recognition attack test device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer-readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by a computing device. Based on the definition in the present specification, the computer-readable medium does not include transitory computer readable media (transitory media) such as a modulated data signal and carrier.

It is worthwhile to further note that the terms "include", "comprise", and their any other variants are intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

A person skilled in the art should understand that the embodiments of the present specification can be provided as methods, systems, or computer program products. Therefore, one or more embodiments of the present specification can use a form of hardware only embodiments, software only embodiments, or embodiments with a combination of software and hardware. In addition, one or more embodiments of the present specification can use a form of a computer program product that is implemented on one or more computer-usable storage media (including but not limited to a disk memory, a CD-ROM, an optical memory, etc.) that include computer-usable program code.

One or more embodiments of the present specification can be described in the general context of computer-executable instructions executed by a computer, for example, a program module. The program module usually includes a routine, a program, an object, a component, a data structure, etc. for executing a specific task or implementing a specific abstract data type. One or more embodiments of the present specification can be practiced in distributed computing environments. In the distributed computing environments, tasks are performed by remote processing devices that are connected through a communications network. In the distributed computing environment, the program module can be located in both local and remote computer storage media including storage devices.

The embodiments of the present specification are described in a progressive way. For same or similar parts in the embodiments, references can be made to these embodiments, and each embodiment focuses on a difference from other embodiments. Particularly, the system embodiments are basically similar to the method embodiments, and therefore are described briefly. For related parts, references can be made to partial description in the method embodiments.

The previous descriptions are merely embodiments of the present specification, and are not intended to limit the present specification. For a person skilled in the art, the present specification can have various modifications and changes. Any modifications, equivalent replacements, and improvements made within the spirit and the principle of the present specification shall fall within the scope of the claims in the present specification.

What is claimed is:

1. A computer-implemented method for performing a biometric recognition attack test on a biometric recognition device, wherein the method comprises:
   obtaining, based on information about a target user to be tested, a test object for performing the biometric recognition attack test corresponding to the target user, wherein the test object comprises a test image or a physical model of a body part of the target user corresponding to the biometric recognition attack test;
   performing the biometric recognition attack test on the biometric recognition device, comprising:
      controlling a mechanical arm to place the test object in a recognition area of the biometric recognition device;
      controlling the mechanical arm to adjust the test object to have a plurality of different test object poses with respect to the biometric recognition device;
      obtaining a test result for the test object in each test object pose of the plurality of different test object poses; and
   determining, based on the test result for the test object in each test object pose of the plurality of different test object poses, an attack test result of the biometric recognition attack test on the biometric recognition device corresponding to the target user;
   wherein controlling the mechanical arm to adjust the test object comprises:

controlling the mechanical arm to adjust the test object along an axis in a three-dimensional coordinate system; or controlling the mechanical arm to adjust the test object along one or more of a predetermined spherical radius, a predetermined horizontal or vertical angle in a polar coordinate system.

2. The computer-implemented method according to claim 1, wherein performing the biometric recognition attack test on the biometric recognition device further comprises:

adjusting the biometric recognition device to have a plurality of different device poses.

3. The computer-implemented method according to claim 1, further comprising:

obtaining test environmental information that comprises one or more of a temperature, humidity, or light intensity; and adjusting the test environmental information based on predetermined reference environmental information to obtain current test environmental information for performing the biometric recognition attack test.

4. The computer-implemented method according to claim 3, wherein obtaining the test object further comprises:

obtaining, based on the information about the target user to be tested in an environment configured to have the current test environmental information for performing the biometric recognition attack test, the test object for performing the biometric recognition attack test on the target user.

5. The computer-implemented method according to claim 1, wherein the test object comprises the test image, and wherein obtaining the test image comprises:

obtaining first data for the target user that is pre-stored in the biometric recognition device, wherein the first data comprises one or more of an image, a video, or a binary file; and determining, based on the first data, the test image for performing the biometric recognition attack test on the target user.

6. The computer-implemented method according to claim 5, wherein obtaining the test image further comprises:

obtaining second data of the target user that is pre-collected by the biometric recognition device through a camera, wherein the second data comprises one or more of an image, a video, or a binary file; and determining, based on the second data, the test image for performing the biometric recognition attack test on the target user.

7. A computer-implemented method for performing a biometric recognition attack test on a biometric recognition device, wherein the method comprises:

obtaining, based on information about a target user to be tested, a test object for performing the biometric recognition attack test corresponding to the target user, wherein the test object comprises a test image or a physical model of a body part of the target user corresponding to the biometric recognition attack test;

performing the biometric recognition attack test on the biometric recognition device, comprising:

controlling a mechanical arm to place the test object in a recognition area of the biometric recognition device;

controlling the mechanical arm to adjust the test object to have a plurality of different test object poses with respect to the biometric recognition device;

obtaining a test result for the test object in each test object pose of the plurality of different test object poses; and determining, based on the test result for the test object in each test object pose of the plurality of different test object poses, an attack test result of the biometric recognition attack test on the biometric recognition device corresponding to the target user;

wherein an area covered by the test object in the plurality of different test object poses is greater than or equal to a test area corresponding to the biometric recognition attack test.

8. A computer-implemented method for performing a biometric recognition attack test on a biometric recognition device, wherein the method comprises:

obtaining, based on information about a target user to be tested, a test object for performing the biometric recognition attack test corresponding to the target user, wherein the test object comprises a test image or a physical model of a body part of the target user corresponding to the biometric recognition attack test;

performing the biometric recognition attack test on the biometric recognition device, comprising:

controlling a mechanical arm to place the test object in a recognition area of the biometric recognition device;

controlling the mechanical arm to adjust the test object to have a plurality of different test object poses with respect to the biometric recognition device;

obtaining a test result for the test object in each test object pose of the plurality of different test object poses; and determining, based on the test result for the test object in each test object pose of the plurality of different test object poses, an attack test result of the biometric recognition attack test on the biometric recognition device corresponding to the target user;

wherein the test object comprises the test image, and wherein the method further comprises:

controlling the mechanical arm to adjust one or more of brightness, color saturation, or a play speed of the test image to perform the biometric recognition attack test; and obtaining an image test result for the test image.

9. The computer-implemented method according to claim 8, wherein determining the attack test result of the biometric recognition attack test comprises:

determining, based on the test result for the test object in each test object pose of the plurality of different test object poses and the image test result for the test image, the attack test result of the biometric recognition attack test.

10. The computer-implemented method according to claim 1, wherein obtaining the test object comprises:

obtaining, based on the information about the target user to be tested, an identifier of the test object for performing the biometric recognition attack test on the target user, wherein the identifier is set based on a graphic code; and controlling the mechanical arm to obtain the test object corresponding to the identifier from a test object database storing multiple test objects based on the identifier.

11. A non-transitory, computer-readable medium storing one or more instructions executable by a computer system to perform operations for performing a biometric recognition attack test on a biometric recognition device, wherein the operations comprise:

obtaining, based on information about a target user to be tested, a test object for performing the biometric recognition attack test corresponding to the target user, wherein the test object comprises a test image or a physical model of a body part of the target user corresponding to the biometric recognition attack test;

performing the biometric recognition attack test on the biometric recognition device, comprising:
- controlling a mechanical arm to place the test object in a recognition area of the biometric recognition device;
- controlling the mechanical arm to adjust the test object to have a plurality of different test object poses with respect to the biometric recognition device;
- obtaining a test result for the test object in each test object pose of the plurality of different test object poses; and determining, based on the test result for the test object in each test object pose of the plurality of different test object poses, an attack test result of the biometric recognition attack test on the biometric recognition device corresponding to the target user;

wherein controlling the mechanical arm to adjust the test object comprises:
- controlling the mechanical arm to adjust the test object along an axis in a three-dimensional coordinate system; or
- controlling the mechanical arm to adjust the test object along one or more of a predetermined spherical radius, a predetermined horizontal or vertical angle in a polar coordinate system.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for performing a biometric recognition attack test on a biometric recognition device, wherein the operations comprise:

obtaining, based on information about a target user to be tested, a test object for performing the biometric recognition attack test corresponding to the target user, wherein the test object comprises a test image or a physical model of a body part of the target user corresponding to the biometric recognition attack test;

performing the biometric recognition attack test on the biometric recognition device, comprising:
- controlling a mechanical arm to place the test object in a recognition area of the biometric recognition device;
- controlling the mechanical arm to adjust the test object to have a plurality of different test object poses with respect to the biometric recognition device;
- obtaining a test result for the test object in each test object pose of the plurality of different test object poses; and determining, based on the test result for the test object in each test object pose of the plurality of different test object poses, an attack test result of the biometric recognition attack test on the biometric recognition device corresponding to the target user;

wherein controlling the mechanical arm to adjust the test object comprises:
- controlling the mechanical arm to adjust the test object along an axis in a three-dimensional coordinate system; or
- controlling the mechanical arm to adjust the test object along one or more of a predetermined spherical radius, a predetermined horizontal or vertical angle in a polar coordinate system.

13. The computer-implemented system according to claim 12, wherein performing the biometric recognition attack test on the biometric recognition device further comprises:
adjusting the biometric recognition device to have a plurality of different device poses.

14. The computer-implemented system according to claim 12, wherein the operations further comprise:
obtaining test environmental information that comprises one or more of a temperature, humidity, or light intensity; and
adjusting the test environmental information based on predetermined reference environmental information to obtain current test environmental information for performing the biometric recognition attack test.

15. The computer-implemented system according to claim 14, wherein obtaining the test object further comprises:
obtaining, based on the information about the target user to be tested in an environment configured to have the current test environmental information for performing the biometric recognition attack test, the test object for performing the biometric recognition attack test on the target user.

16. The computer-implemented system according to claim 12, wherein the test object comprises the test image, and wherein obtaining the test image comprises:
obtaining first data for the target user that is pre-stored in the biometric recognition device, wherein the first data comprises one or more of an image, a video, or a binary file; and
determining, based on the first data, the test image for performing the biometric recognition attack test on the target user.

17. The computer-implemented system according to claim 16, wherein obtaining the test image further comprises:
obtaining second data of the target user that is pre-collected by the biometric recognition device through a camera, wherein the second data comprises one or more of an image, a video, or a binary file; and
determining, based on the second data, the test image for performing the biometric recognition attack test on the target user.

18. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for performing a biometric recognition attack test on a biometric recognition device, wherein the operations comprise:

obtaining, based on information about a target user to be tested, a test object for performing the biometric recognition attack test corresponding to the target user, wherein the test object comprises a test image or a physical model of a body part of the target user corresponding to the biometric recognition attack test;

performing the biometric recognition attack test on the biometric recognition device, comprising:
controlling a mechanical arm to place the test object in a recognition area of the biometric recognition device;
controlling the mechanical arm to adjust the test object to have a plurality of different test object poses with respect to the biometric recognition device;
obtaining a test result for the test object in each test object pose of the plurality of different test object poses; and determining, based on the test result for the test object in each test object pose of the plurality of different test object poses, an attack test result of the biometric recognition attack test on the biometric recognition device corresponding to the target user;

wherein an area covered by the test object in the plurality of different test object poses is greater than or equal to a test area corresponding to the biometric recognition attack test.

\* \* \* \* \*